Figure 1:
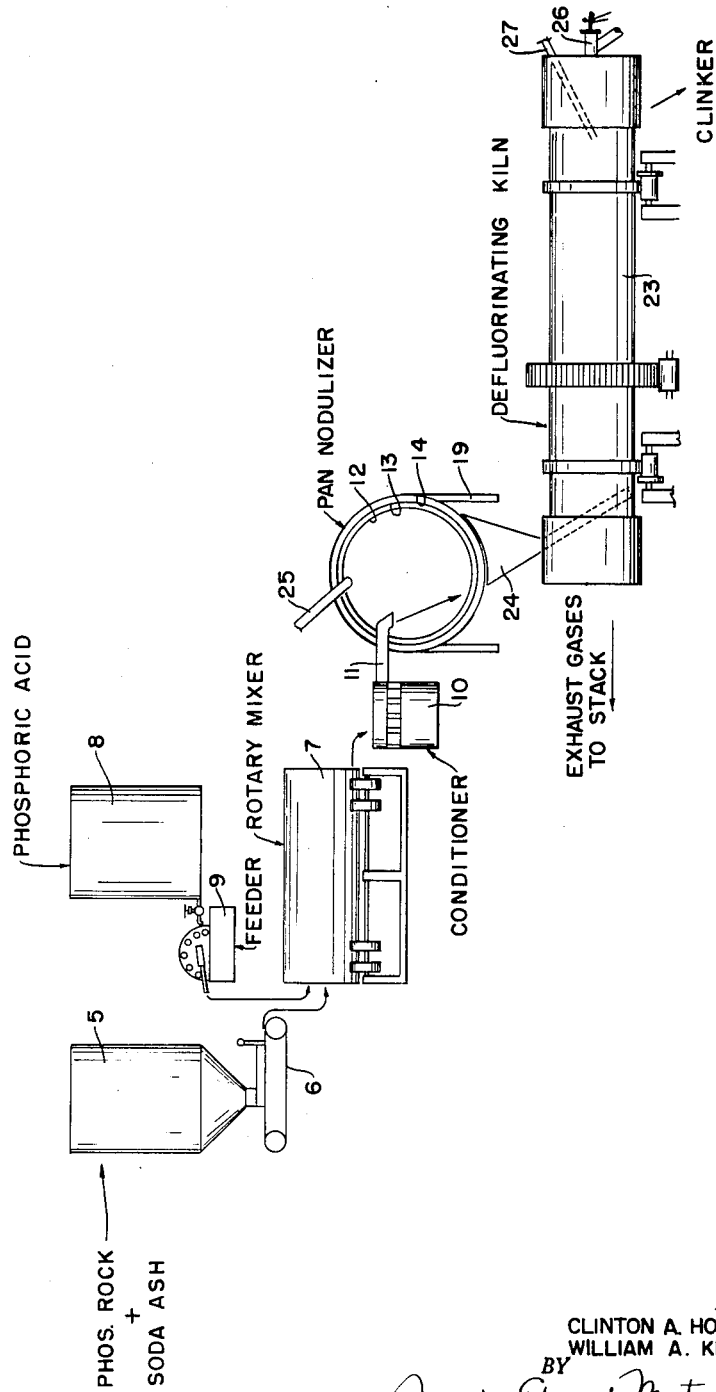

Aug. 8, 1961  C. A. HOLLINGSWORTH ET AL  2,995,436
DEFLUORINATION OF PHOSPHATE ROCK

Filed Nov. 29, 1957  2 Sheets-Sheet 2

INVENTOR.
CLINTON A. HOLLINGSWORTH
WILLIAM A. KIRKLAND
BY

ATTORNEYS

United States Patent Office 2,995,436
Patented Aug. 8, 1961

2,995,436
DEFLUORINATION OF PHOSPHATE ROCK
Clinton A. Hollingsworth, Lakeland, and William A. Kirkland, Plant City, Fla., assignors to Smith-Douglass Company, Incorporated, Norfolk, Va., a corporation of Virginia
Filed Nov. 29, 1957, Ser. No. 699,698
19 Claims. (Cl. 71—44)

This invention relates to the defluorination of phosphate rock and similar natural phosphate materials, and has for its object the provision of an improved method of defluorinating such materials by calcination without substantial fusion.

The principal difficulty encountered in the defluorination of phosphate rock by calcination arises from the fact that the temperature required for the removal of fluorine is so near the fusion temperature of the rock that objectionable fusion or sintering takes place before the removal of fluorine to the desired extent is effected. Hence, it is not practical to operate at the optimum defluorinating temperature unless some means is provided to prevent fusion at that and somewhat higher temperatures, because at times the operating temperature (particularly in a rotary kiln) will inadvertently rise above the fusion temperature. In an extensive investigation of the effects of silica ($SiO_2$), phosphoric acid ($H_3PO_4$ or $$3(H_2O) \cdot P_2O_5)$$

and sodium carbonate or soda ash ($Na_2CO_3$) in promoting the removal of fluorine from phosphate rock and in influencing the fusion temperature of the calcining charge, it has heretofore been determined that by properly proportioning the relative amounts of these three reagents included in the calcining charge, and with due consideration of the grade ($P_2O_5$ content) and the lime (CaO) and silica contents of the phosphate material, sufficient refractoriness can be imparted to the calcining charge to withstand without substantial fusion the high calcining temperature (i.e. at least 2600° F.) which is necessary to effect substantially complete defluorination in kilns of commercial size. In the heretofore preferred practice of this so-called "soda-acid" process of defluorinating phosphate rock by calcination in rotary kilns of commercial size, satisfactory results have been achieved by including in the calcining charge around 6 to 8% by weight of an aqueous reagent mixture consisting essentially of the reaction product of soda ash and phosphoric acid in which the ratio of $Na_2O$ to $P_2O_5$ is about 1. The phosphate material should contain 2 to 6% by weight of silica, and the mol ratio of the constituents of the calcining charge as determined by the molar formula $$\frac{\text{Mols CaO} + \text{Na}_2\text{O} - 3\text{P}_2\text{O}_5}{\text{Mols SiO}_2}$$

should be between 1.6 and 2.

It has been customary to feed the phosphate rock to the kiln in the form of an unground plant concentrate containing around 11% of moisture ($H_2O$), and to simultaneously feed the aqueous reagent mixture to the kiln with sufficient additional water to give a slurry of the mixed rock and reagent mixture containing about 35% of water. While calcination in the presence of water vapor, usually at a temperature around 2750° F., can be carried out in a single pass through the kiln, it has been found more advantageous to carry out the calcination in two stages, that is in two passes through the kiln, the first at a calcining temperature of about 2300° F., and the second at a calcining temperature of about 2750° F., the rock and reaction mixture being fed to the kiln, for the first pass, in the manner hereinbefore described, and the clinker of the first pass being crushed to mostly minus ¼ inch and fed to the kiln for the second pass.

While this so-called "soda-acid" process has been operated profitably for several years, excessive dust losses have been encountered and on occasions objectionable coating buildups and rings have caused serious operating difficulties. It is the aim of the present invention to eliminate or substantially reduce these dust losses and operating difficulties.

We have now discovered, after a further extensive investigation in small scale laboratory and pilot plant work and commercial scale operations, that the aforementioned difficulties can be overcome by feeding the calcining charge to the defluorinating kiln in the form of specially prepared nodules. Nodulizing the charge fed to a defluorinating kiln has heretofore been suggested in the prior art, but so far as we are aware complete defluorination of a nodulized charge by calcination without fusion has never been heretofore accomplished in a commercial scale operation. We believe this is due to the fact that heretofore it has been considered necessary to grind the phosphate rock to a fine particle size (e.g. mostly through a 200 mesh Tyler standard screen series), and in a wide experience with nodules prepared from such finely divided phosphate material we have found that the nodules tend to shrink and become quite dense during calcination and are extremely difficult to defluorinate because of their density and lack of porosity. It was not until we had developed the method of the invention for nodulizing coarse or granular phosphate material, such as unground plant concentrates, that we effected complete defluorination of nodules by calcination without fusion at temperatures within the range of 2500 and 2750° F., and under certain conditions, hereinafter described, even at temperatures as low as 2300° F.

In its preferred aspect the invention involves the steps of adding phosphoric acid to a mixture of soda ash and coarse or granular phosphate material, such as unground plant concentrates mostly (i.e. at least 90% by weight) through 14 mesh and on 150 mesh, thoroughly mixing the acid with the premixed rock and soda ash, nodulizing the mixture with a moisture content within the range of 10 to 20% to form nodules for the most part of a size within the range of ⅛ to ½ inch in diameter, and feeding the nodules, direct from the nodulizer or after drying depending on operating conditions, into a defluorinating kiln where the nodules are promptly subjected to an initial temperature of at least 1200° F., and then heated to a calcining temperature within the range of 2500 to 2750° F. in a kiln retention period of less than one hour. The preparation of satisfactory nodules for defluorination requires careful correlation of various essential conditions such (among others) as the physical character of the phosphate material, the relative proportions of soda ash and phosphoric acid mixed with the granular rock, the temperature of the phosphoric acid, the nature of the nodulizing treatment and the moisture content of the mixture undergoing treatment for forming nodules of optimum size for defluorination, and the subsequent treatment of the nodules prior to defluorination. These essential conditions will now be discussed in detail.

The conventional practices of concentrating Florida phosphate rocks are essentially repeated washing and screening operations, coupled with flotation or other concentrating processes, and produce relatively coarse and granular mill products. For example, the mill at the Tenoroc Mine (near Coronet, Florida) customarily produces four different mill products (in addition to pebble rock coarser than 6 mesh). Representative screen analysis of these products are as follows:

WASHER PLANT SCREEN PRODUCT

| Mesh | +6 | −6 +8 | −8 +10 | −10 +14 | −14 +20 | −20 +28 | −28 |
|---|---|---|---|---|---|---|---|
| Percent | 0.7 | 13.1 | 31 | 38.4 | 12.3 | 3 | 1.5 |

TWO BELT CONCENTRATES (A AND B)

| Mesh | −10 +14 | −14 +20 | −20 +28 | −28 +35 | −35 +48 | −48 +65 | −65 |
|---|---|---|---|---|---|---|---|
| A, percent | 4 | 13.3 | 24.2 | 12.7 | 31.5 | 11.9 | 2.4 |

| Mesh | +20 | −20 +28 | −28 +35 | −35 +48 | −48 +65 | Pan (−65) |
|---|---|---|---|---|---|---|
| B, percent | 21.6 | 22 | 17.3 | 16.5 | 14.4 | 8.2 |

TWO FROTH FLOTATION CONCENTRATES (C AND D)

| Mesh | +20 | −20 +35 | −35 +65 | −65 +150 | −150 |
|---|---|---|---|---|---|
| C, percent | .6 | 22.3 | 43.6 | 32.8 | 0.7 |

| Mesh | −28 +35 | −35 +48 | −48 +65 | −65 +100 | −100 +150 | −150 |
|---|---|---|---|---|---|---|
| D, percent | 1.5 | 5.5 | 19.3 | 51 | 17.5 | 5.2 |

THREE PLANT CONCENTRATES (E, F AND G) (COMBINED BELT AND FROTH FLOTATION CONCENTRATES)

| Mesh | +14 | −14 +20 | −20 +28 | −28 +35 | −35 +48 | −48 +65 | −65 +100 | −100 |
|---|---|---|---|---|---|---|---|---|
| E, percent | 2.3 | 7.1 | 9.5 | 11.7 | 16.9 | 26.7 | 17.5 | 8.8 |
| F, percent | 1.1 | 3.6 | 5.5 | 5.8 | 10.9 | 30.7 | 36.5 | 5.9 |
| G, percent | | (+20) 7.2 | 7.5 | 10.5 | 16.8 | 34 | 16.4 | 7.6 |

These mill products are customarily referred to as unground concentrates, to distinguish them from finely ground phosphate rock, such as has heretofore been considered necessary for many proposed methods of defluorination and especially for preparing a nodulized feed. The washer plant screen product is usually too coarse for good nodulization, but may be blended with less coarse material. While belt and froth flotation concentrates may be nodulized, plant concentrate (a blend of belt and froth flotation concentrates) is of a size more suitable for nodulizing. The size of unground phosphate concentrates suitable for the purposes of the invention may be defined as at least 90% by weight within the range of minus 14 mesh and plus 150 mesh with at least 25% (and preferably 50%) by weight plus 65 mesh. More usually in practice, the nodules of the invention are prepared from an unground phosphate rock, such as a plant concentrate, of which at least 95% by weight is minus 14 mesh and plus 150 mesh with at least 85% by weight within the range of minus 20 mesh and plus 100 mesh.

In all these unground mill products, individual or discrete particles, as well as aggregates of discrete particles, are relatively porous. For example, the dried particles will absorb a considerable amount of water. This porosity promotes the flow through and escape from each particle of the fluorine evolved during calcination. Moreover, when such particles are nodulized in accordance with the invention, the voids between individual particles in each nodule provide channels through which the evolved fluorine readily escapes. For these reasons nodules made from unground phosphate rock concentrates retain during defluorination by calcination a high degree of porosity (as compared with nodules made of finely ground rock) and can be readily defluorinated, whereas nodules made of finely ground rock are quite difficult to defluorinate. However, the preparation of nodules from a coarse phosphate material, such as an unground plant concentrate, of sufficient strength to hold up under prefeeding conditions and under the tumbling action of a rotary kiln and at the same time possessing adequate refractoriness to withstand without fusion a calcining temperature of at least 2500° F. is not a simple or obvious operation and has not heretofore been successfully achieved in the art.

Phosphoric acid in conjunction with soda ash and constituents in the phosphate rock itself has been found the most satisfactory bonding agent for unground phosphate concentrates. Moreover, the inclusion of soda ash and phosphoric acid in the calcining charge, within certain prescribed limits, imparts adequate refractoriness to the charge to withstand without fusion the high calcining temperature required for defluorination. But, we have found that mixing with the coarse phosphate rock a reagent mixture consisting of the reaction product of soda ash and phosphoric acid, as in the aforementioned soda-acid process, does not produce satisfactory nodules as feed to the defluorinating kiln, and additionally, we have found that the heretofore usual relative proportions of soda ash and phosphoric acid added to the phosphate rock in the form of the reagent mixture are inadequate for the preparation of satisfactory nodules.

In accordance with the invention, the granular phosphate rock is thoroughly mixed with soda ash and an aqueous solution of phosphoric acid in definite relative proportions hereinafter recited. Preferably, the rock is first thoroughly mixed with the soda ash and an aqueous solution of phosphoric acid is then added to and thoroughly mixed and blended with the premixed rock and soda ash. The moisture content of the mix is important for subsequent nodulization and should be adjusted to within the range of 10 to 20% (preferably around 12 to 15%) based on the combined weight of rock, soda ash, phosphoric acid and moisture ($H_2O$). The phosphate rock customarily contains 10 to 12% moisture, and the additional moisture required to impart to the mix the degree of moisture desired for nodulizing is obtained from the aqueous solution of phosphoric acid. If the moisture content of the rock is greater than about 12% some drying may be required. This can be accomplished by passing hot air through the mix in an appropriate conditioner ahead of the nodulizer. Where the moisture content of the mix can be held below about 14%, nodulization may be promoted by spraying a small amount of water on the forming nodules.

In the practice of the aforementioned soda-acid process, the usual percentages (by weight) of $Na_2O$ and $P_2O_5$ added (in the form of the reagent mixture) to the rock are 4.5 and 5.5, respectively. For the purposes of the present invention these percentages do not impart to the nodules sufficient green or dry strength for feed to a defluorinating kiln, and we have found that for satisfactory nodulization the moistened rock mix should include at least 5% of added $Na_2O$ and at least 7% of added $P_2O_5$, by weight based on the dry weight of the mix. Moreover, the added $Na_2O$ and added $P_2O_5$ should be within certain prescribed ratios in order to produce nodules of satisfactory strength and refractoriness. Thus, the amount of soda ash (calculated as $Na_2O$) and the amount of phosphoric acid (calculated as $P_2O_5$) included in the mixture of granular phosphate rock, soda ash and acid should be within the ranges of 5 to 9% and 7 to 11%, respectively, based on the dry combined weight of rock, soda ash and acid. The following table indicates the desirable ranges of added $Na_2O$ percent corresponding to an added $P_2O_5$ percent of from 7 to 11.

| Percent added $P_2O_5$ | Percent added $Na_2O$ | |
| --- | --- | --- |
| | Maximum | Minimum |
| 7 | 6.0 | 5.0 |
| 8 | 7.2 | 5.6 |
| 9 | 7.8 | 6.0 |
| 10 | 8.4 | 6.4 |
| 11 | 9.0 | 6.8 |

Very satisfactory results have been obtained in practice with from 8 to 10% added $P_2O_5$ and from 6 to 7% added $Na_2O$. The combined weight of added $Na_2O$ and added $P_2O_5$ is within the range of 12 to 20% (and preferably 14 to 16%), based on the dry weight of the mix. Where the rock and soda ash are not premixed, that is when the soda ash and phosphoric acid are simultaneously added to the rock, the added phosphoric acid is advantageously relatively high, say 10 to 11%.

The silica content of the phosphate rock should be not less than 2% and not more than 6%, based on the dry weight of the rock. With the usual unground plant concentrates, the silica content will generally be between 3 and 4%, and the concentrate will analyze around 35% (say 33 to 36%) $P_2O_5$, and around 50% CaO; thus having a BPL content of around 75%. With such a rock and additions of $Na_2O$ and $P_2O_5$ within the aforementioned preferred ranges, the mol ratio of the constituents of the nodulized calcining charge represented by the aforementioned molar formula will be about 1.

Commercial light soda ash having a $Na_2O$ content of about 58% (over 98% $Na_2CO_3$) is a satisfactory form of sodium carbonate. Crude commercial phosphoric acid resulting from reacting sulphuric acid with a phosphate-bearing material (e.g. phosphate rock) is a satisfactory form of phosphoric acid. While the concentration of the phosphoric acid is not critical, it should be sufficiently high to avoid unduly increasing the moisture content of the moist mixture of rock, soda ash and acid. Satisfactory results have been attained with crude commercial phosphoric acid having a $P_2O_5$ content within the range of 45 to 55% (i.e. around 62 to 76% $H_3PO_4$).

The initial temperature of the phosphoric acid, i.e. when added to the premix of rock and soda ash or when added simultaneously with soda ash to the rock, should not be lower than 65° F., otherwise the nodules have inadequate strength and tend to disintegrate in the defluorinating kiln. In general, the temperature of the acid is within the range of 65 to 120° F., and preferably within the range of 75 to 95° F. The action between the premix and the acid is exothermic, and the temperature of the moistened mix in the mixer, after the introduction of the acid at a temperature between 75 and 95° F., is normally within the range of 80 to 100° F.

While the nodules may be formed in various ways, we have found it of special advantage to form the nodules by centrifugal action of a pan or disc type nodulizer. The pan type nodulizer produces uniform nodules of the size found most desirable for the feed to the defluorinating kiln, and with little or no residual fines or oversize thus minimizing and even eliminating the need for screening and recycling.

Wet nodules may be fed directly from the nodulizer to the defluorinating kiln, or the nodules may be pre-dried before feeding to the kiln. For feeding wet nodules directly to the kiln, good wet strength is necessary, and the surface of the nodules should be dry to minimize cohesion or sticking together during subsequent handling, particularly in or near the feed chute to the kiln. Nodules cannot be readily formed with a comparatively dry surface, but we have found that a satisfactory dry surface can be simulated by coating or dusting the nodules with a powder-like or finely divided dry material. Thus, as the nodules are discharged from the pan-type nodulizer, or just prior to entering the kiln, they may be coated with a compatible powder-like material (i.e. one having no adverse effect on the defluorinating operation) such as pulverized coal or coke, sawdust, rice or other grain hulls, flour, or equivalent powder-like material advantageously organic which will burn off in the kiln without any adverse effect on the necessary refractoriness or porosity of the nodules, such, for example, as silica flour, powdered limestone and the like might have. Where the coating material is of fine particle size it should be of a combustible nature since otherwise it tends to seal the surface of the nodules and hinders defluorination. However, a relatively coarse non-combustible material such as stack dust, may be used where the percentage of fines in the material is not too great.

Where it is impracticable or undesirable to feed wet nodules directly to the defluorinating kiln, as for example where the nodules are to be stock-piled, they should be at least partially dried, and when it is advantageous that the nodules be non-hygroscopic drying at temperatures in excess of 450° F. is required. In general, nodules having good wet strength make superior dry nodules. However, the method of drying has a marked effect on the dry strength of the nodules. Uniform heating and free circulation of air are necessary to produce satisfactory dry nodules. Drying in a blast of warm air at a temperature within the range of 250 to 400° F. improve the physical properties of the nodules. Shock resistance is optimum when the nodules contain some moisture, say between 4 and 6%. However, the crush strength of the nodules improves as they become dryer.

Nodules dried at temperatures less than about 450° F.

are hygroscopic and cannot be stored in a moist atmosphere without loss of strength. However, when dried in a rotary dryer at temperatures in excess of 450° F., the nodules have good shock resistance and crush strength, and are not hygroscopic. The drying temperature should not be so high as to cause any evolution of fluorine, and need not greatly exceed 450° F. to produce non-hygroscopic nodules.

The nodules should be promptly heated to an initial temperature of 1200 to 1500° F. upon being fed to the defluorinating kiln. Thus, in a rotary kiln where the nodules are fed to the rear or cold end of the kiln, the temperature of the gases exhausted from that end of the kiln should be within the range of 1200 to 1500° F. In the two-stage calcination of the soda-acid process as customarily practiced, the gases are exhausted from the cold end of the first pass kiln at a temperature of about 800° F. We have found that when nodules prepared in accordance with the principles of the invention, and particularly wet nodules direct from the nodulizer, are fed to a rotary kiln in which the gases are exhausted at a temperature of 800 to 1000° F., the nodules tend to disintegrate and form coatings and rings near the feed end of the kiln, and the discharge from the kiln consists largely of fines. Accordingly, calcination of nodules prepared in accordance with the invention is customarily carried out in a single stage or pass, and the nodules are heated as promptly as practical to an initial temperature of about 1200° F. However, nodules prepared in accordance with the invention may be calcined in two stages, provided the first pass kiln is short so that the gases exhausted at the rear end have a temperature of about 1200° F. and the temperature at the forward or firing end of the kiln does not exceed about 2200° F. The ultimate calcining temperature (whether single or two stage) is generally at least 2500° F. (and usually 2500 to 2750° F.) in order to maintain a high tonnage output. But lower calcining temperatures can be used by decreasing tonnage or by increasing the kiln detention time, although, in most cases, either expedient would be less practical than operating at a higher temperature.

The phosphate content of the calcined product (clinker) has high fertilizer availability, as determined by its solubility in a solution of citric acid or neutral ammonium citrate. The low fluorine content of the clinker, less than one part of fluorine per one hundred parts of phosphorus, meets the present high standard set by A.A.F.C.O as a phosphate mineral supplement for animal feeds. The availability of the phosphate as such a mineral supplement is further indicated by its high solubility in 0.4% hydrochloric acid (HCl) solution. The practical correlation of the foregoing conditions which we have found essential in the preparation of satisfactory nodules as feed for the defluorinating kiln will be better understood from the following description of an operation carried out in the equipment shown, merely by way of example, in the accompanying drawings, in which FIG. 1 diagrammatically illustrates the general arrangement of the principal equipment recommended for practicing the invention, and FIG. 2 is an elevation, partly in section, of a pan nodulizer particularly adapted for forming uniform nodules of the size contemplated by the invention.

In the equipment illustrated in the drawings, phosphate rock and soda ash is premixed and stored in a bin 5 and delivered by a belt feeder 6 at a predetermined rate to a rotating drum conditioner such as a rotary mixer 7. Simultaneously, an aqueous solution of phosphoric acid is delivered at a predetermined rate to the rotary mixer from a storage tank 8 through a liquid reagent feeder 9. Mixing, blending and conditioning is effected in the rotary mixer with a detention period of from 10 to 20 minutes and the moist blended mixture of rock-soda ash-acid is passed to a conditioner 10, which may be a vibrating screen for rejecting oversize or fines, as conditions may require; or a dryer for adjusting the moisture content of the mixture; or any other required type of conditioner. The suitably conditioned moist mixture is delivered by a feed pipe 11 to near the periphery of the center well 12 of a disc or pan nodulizer.

Figure 2:
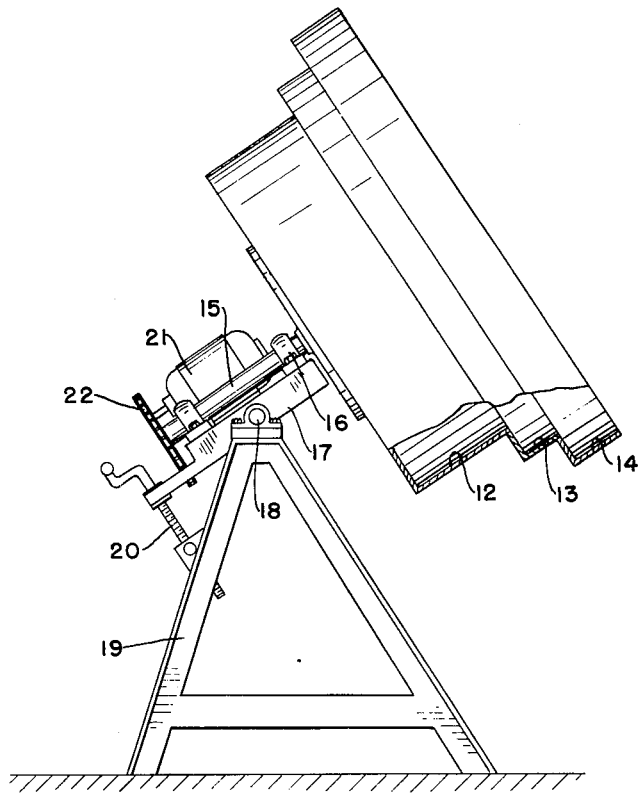

The pan nodulizer is shown in greater detail in FIG. 2. It consists of a plurality of superposed circular pans or saucers of progressively increasing diameters mounted to rotate about their common center axis at an inclined angle (e.g. inclined at an angle of say 30 to 40 degrees with respect to the horizontal). The nodulizer shown in FIG. 2 has three pans, namely a relatively deep center well 12, closed at the bottom but open at the top, an intermediate annular pan 13, of greater diameter than the well 12, and an outer annular pan 14 of greater diameter than the pan 13. The inner edge of the annular bottom of the pan 13 is welded, or otherwise suitably secured, to the upper edge of the cylindrical wall of the well 12, and the inner edge of the annular bottom of the pan 14 is welded, or otherwise suitably secured, to the upper edge of the cylindrical wall of the pan 13. A rotatably mounted shaft 15 is secured to the closed bottom of the well 12 in alignment with the center axis of the pans. The bearings 16 of the shaft are secured to a base 17 pivotally mounted at 18 to a supporting frame 19. The inclination of the base 17, and hence of the shaft 15, is adjusted by a rod 20 rotatably secured to the base 17 and operatively screw-threaded in a nut fastened to the frame 19. The shaft 15 is driven by a variable speed electric motor 21 through suitable gearing 22. The mix forms into small nodules as it is thrown centrifugally about the rotating inclined pans and from the periphery of an inner pan into the adjacent outer pan, and the formed nodules are discharged from the periphery of the outer pan 14. By varying the inclination and speed of rotation of the pans, the size of the nodules can be varied. In general, the slower the speed of rotation and the steeper the inclination of the pans, the smaller will be the nodules.

In the equipment shown in FIG. 1, the wet nodules are delivered directly from the pan nodulizer to the rear or cold end of the rotary defluorinating kiln 23 through a combined nodule collector and feed chute 24. The exhaust gases from the kiln have a temperature of from 1200 to 1500° F. where the nodules are fed to the kiln. Just before the wet nodules leave the nodulizer they may be surface-coated with pulverized coal (or the like) which is delivered to the annular bottom of the outer pan 14 through a feed pipe 25. Where wet, uncoated nodules are fed directly to the kiln, it is advantageous to vibrate the feed chute or provide other positive means for introducing the nodules to the kiln. The rotary kiln is fired by a burner or burners 26 at its forward end, and the calcined nodules (clinker), after being heated to a temperature usually within the range of 2500 to 2750° F. in a kiln retention period usually not exceeding one hour, and preferably about 30 to 40 minutes, are quenched to a temperature below 2000° F. as they are discharged from the kiln. Quenching water, delivered from a supply pipe 27, is directly sprayed onto the hot nodules, and the resulting water vapor mixes with the combustion gases from the burner and provides the major portion of the water vapor atmosphere necessary for defluorination. In practice, the rate (e.g. pounds per minute) at which quenching water is sprayed onto the hot nodules is approximately from one quarter to one-half the rate of clinker discharge.

The following example illustrates a typical practice of the invention in a rotary kiln 3 feet in diameter and 40 feet long set at a pitch of ½ inch per foot, and revolving at a speed of one revolution in about 15 seconds. The calcining temperature (hot or forward end of kiln) was approximately 2750° F. and the temperature of the gases exhausted from the cold or rear end of the kiln was approximately 1300° F. Nodulized phosphate rock was fed to the kiln at the rate of about 300 pounds per hour, and quenching water was vaporized at the hot end of the kiln at the rate of approximately 100 pounds per hour. Retention time of the charge in the kiln was approximately 30 minutes.

The phosphate rock was an unground plant concentrate of which at least 95% by weight was within the range of minus 14 mesh and plus 150 mesh and at least 85% by weight was within the range of minus 20 mesh and plus 100 mesh, with over 50% plus 65 mesh. The concentrate had the following approximate screen analysis:

| +14 mesh | −14 +20 | −20 +35 | −35 +65 | −65 +100 | −100 |
|---|---|---|---|---|---|
| 0.5% | 7 | 20 | 45 | 25 | 2.5 |

The composition of the calcining charge was as follows:

| | Percent Wt. | P₂O₅ | SiO₂ | CaO | Na₂O | F |
|---|---|---|---|---|---|---|
| Phosphate rock | 86 | 34.45 | 2.98 | 48.50 | | 3.10 |
| P₂O₅ (as H₃PO₄) | 8 | 100.00 | | | | |
| Na₂O (as Na₂CO₃) | 6 | | | | 100 | |
| Calcining charge | 100 | 37.62 | 2.56 | 41.71 | 6 | 3.35 |

The mol ratio of the constituents of the calcining charge as determined by the aforementioned molar formula is 1.07.

The phosphate rock (about 75% BPL) and soda ash were premixed and delivered onto the belt feeder 6 discharging into the rotary mixer 7. The phosphoric acid was introduced into the mixer by the reagent feeder 9, at a temperature of about 80° F. The moisture content of the rock was about 11%, and the P₂O₅ concentration of the phosphoric acid was 48% (66% H₃PO₄), and the discharge from the mixer had a moisture content of about 14%. The mix was thoroughly blended and conditioned for 10 to 15 minutes, and was discharged onto a vibrating screen which rejected the oversize (plus ½ inch) and passed the undersize to the pan type nodulizer. The speed and inclination of the nodulizer were adjusted to produce nodules for the most part of from ¼ to ½ inch in diameter, with practically no fines. Just prior to leaving the nodulizer, the nodules were coated with powdered coal dust, which reduced their moisture content to around 12%. The coated nodules were fed directly from the nodulizer to the defluorinating kiln.

The clinker represented a recovery of about 90% on the dry weight of the nodulized feed, the balance being made up of about equal amounts of the fluorine evolved, organic material ($CO_2$ etc.) unaccountables, and a negligible amount of stack dust. The clinker analysis was as follows, high fertilizer availability being shown by the citric acid and neutral ammonium citrate solubilities of the phosphorus, and the availability as a mineral supplement for animal feed being shown by the high solubility of the phosphorus in the 0.4% hydrochloric acid solution and its low fluorine content (less than 0.4 part of fluorine per 100 parts of phosphorus):

CLINKER ANALYSIS

| | Percent |
|---|---|
| Phosphorus, total | 17.77 |
| Phosphorus, soluble in 0.4% HCl | 17.61 |
| Phosphorus, soluble in 2% citric acid | 15.81 |
| Phosphorus, soluble in neutral am. citrate | 15.38 |
| Na₂O | 5.99 |
| Fluorine | 0.07 |
| Ca | 32.24 |

In commercial practice, where maximum capacity is important, the preferred defluorinating temperature is within the range of 2500 to 2750° F. However, by employing a longer kiln detention time and/or by decreasing the tonnage output satisfactory defluorination can be achieved at temperatures as low as 2300° F.

While the foregoing example illustrates a typical practice of the invention, local conditions and circumstances may prompt many deviations without departing from the spirit of the invention. For instance calcination may be carried out in two stages, as hereinbefore mentioned. While calcining temperatures of at least 2500° F. are usually preferred, defluorinating in the presence of soda ash, does take place at temperatures as low as 2300° F. However, at such relatively low temperatures, the Na₂O addition (as soda ash) should be at least 6%, and preferably higher. With increased additions of soda ash, the minimum temperature necessary for good fertilizer availability decreases, mainly because sodium phosphates and calcium-sodium phosphates do not revert to the citrate-insoluble form as readily as calcium phosphates.

Essentially complete defluorination may also be effected at temperatures as low as about 2300° F. with high reagent feed. This is illustrated by the following example, in which nodulization of the phosphate rock (a plant concentrate) and reagents was carried out in a rotating drum, producing nodules slightly larger than ¼ inch, and the nodulized charge was calcined at various temperatures in a laboratory electric furnace in an atmosphere of water vapor. The composition of the calcining charge and the clinker analyses were as follows:

| | Percent Wt. | P₂O₅ | Insol. | CaO | Na₂O | F |
|---|---|---|---|---|---|---|
| Phosphate rock | 83.2 | 34.92 | 4.00 | 49.99 | | 3.84 |
| P₂O₅ (as H₃PO₄) | 10.0 | 100.00 | | | | |
| Na₂O (as soda ash) | 6.8 | | | | 100.00 | |
| Calcining charge | 100.0 | 39.05 | 3.32 | 41.59 | 6.8 | 3.19 |

The mol ratio of the constituents of the calcining charge as determined by the aforementioned molar formula was 0.48.

CLINKER ANALYSES

| Calcining Time, minutes | Temp., °F. | Percent F | Total P₂O₅ | P₂O₅ Availables | | |
|---|---|---|---|---|---|---|
| | | | | 0.4 HCl | 2% Citric | N.A.C. |
| 10 | 2,200 | 0.68 | | | | |
| 10 | 2,300 | 0.35 | | | | |
| 20 | 2,300 | 0.12 | 41.45 | 40.06 | 39.62 | 39.12 |
| 10 | 2,400 | 0.006 | | | | |
| 10 | 2,500 | 0.002 | | | | |
| 10 | 2,600 | 0.002 | 41.62 | 41.62 | 40.53 | 40.54 |

Some phosphate producers do not blend froth flotation concentrates with belt or table concentrates. However, as previously stated, froth flotation concentrates may be nodulized in accordance with the principles of the invention, although the decreased porosity of the nodules results in reduced efficiency of operation. For example, in defluorinating nodules prepared from froth flotation concentrates (as compared with plant concentrates), it may be necessary to go to higher calcining temperatures and/or longer kiln detention times, or reduced tonnage output.

The high grade, around 18% phosphorus, of the defluorinated product (clinker) is among the several advantageous features of the invention. The clinker produced by the prior art soda-acid process has a phosphorus content of around 17%. However, the most outstanding advantages of the invention are a trouble free single pass operation with increased capacity and reduction of stack dust to a negligible minimum. This results in an increase of the fluorine concentration of the exhaust gases, lessening the problem of fluorine recovery. Additionally the nodulized charge, especially when the nodules are coated, has little tendency to form rings and build up in the kiln, and the clinker is fairly uniform in size.

We claim:
1. In the method of producing a defluorinated phosphate product having high fertilizer availability in which a phosphate material with a silica content of from 2 to 6% is calcined in the presence of water vapor and without fusion at a temperature of at least 2300° F. and the hot calcine is quenched to a temperature below 2000° F., the improvement which comprises mixing an unground phosphate rock concentrate with soda ash and an aqueous solution of phosphoric acid in the presence of from 10 to 20% by weight of water, the amount of soda ash (calculated as $Na_2O$) and the amount of phosphoric acid (calculated as $P_2O_5$) included in the moist mixture of concentrate, soda ash and acid being within the ranges of 5 to 9% and 7 to 11%, respectively, based on the dry weight of the mixture, forming the moist mixture of concentrate, soda ash and acid into porous nodules, and subjecting the nodules to calcination of the character hereinbefore recited.

2. The improvement according to claim 1, further characterized in that the nodules are fed directly to a rotary kiln and calcined in a single pass therethrough, the exhaust gases of the kiln having a temperature of at least 1200° F.

3. The improvement according to claim 1, further characterized in that the phosphoric acid has an initial temperature within the range of 65 to 120° F.

4. The improvement according to claim 1, further characterized in that the $Na_2O$ mixed with the rock (in the form of soda ash) with from 7 to 11% of $P_2O_5$ mixed with the rock (in the form of phosphoric acid) is within the percentage ranges shown in the following table with respect to each percentage addition of $P_2O_5$ from 7 to 11:

| Percent $P_2O_5$ | Percent $Na_2O$ | |
|---|---|---|
| | Maximum | Minimum |
| 7 | 6.0 | 5.0 |
| 8 | 7.2 | 5.6 |
| 9 | 7.8 | 6.0 |
| 10 | 8.4 | 6.4 |
| 11 | 9.0 | 6.8 |

5. The improvement according to claim 1, further characterized in that at least 90% by weight of the phosphate rock concentrate is of a size within the range of minus 14 mesh and plus 150 mesh with at least 25% by weight plus 65 mesh.

6. In the method of producing a defluorinated phosphate product having high fertilizer availability in which a phosphate material with a silica content of from 2 to 6% is calcined in the presence of water vapor and without fusion at a temperature of at least 2300° F. until the fluorine remaining in the resulting calcine is less than one part per one hundred parts of phosphorus and the hot calcine is quenched to a temperature below 2000° F., the improvement which comprises mixing an unground phosphate rock concentrate with soda ash, mixing an aqueous solution of phosphoric acid with the premixed concentrate and soda ash moistened by the presence of from 10 to 20% by weight of water, the amount of soda ash (calculated as $Na_2O$) and the amount of phosphoric acid (calculated as $P_2O_5$) included in the moist mixture of concentrate, soda ash and acid being within the ranges of 5 to 9% and 7 to 11%, respectively, based on the dry weight of the mixture, forming the moist mixture of concentrate, soda ash and acid into porous nodules, and subjecting the nodules to calcination of the character hereinbefore recited.

7. The improvement according to claim 6, further characterized in that the nodules are fed directly to a rotary kiln and calcined in a single pass therethrough at a temperature of at least 2500° F. and with a kiln detention period not exceeding one hour, the exhaust gases of the kiln having a temperature of at least 1200° F.

8. The improvement according to claim 6, further characterized in that promptly after the nodules are formed their surfaces are coated with a compatible powder-like material to minimize cohesion of the nodules during subsequent handling.

9. The improvement according to claim 6, further characterized in that the phosphoric acid has an initial temperature within the range of 65 to 120° F.

10. The improvement according to claim 6, further characterized in that the nodules are heated to a temperature of at least 450° F. prior to being fed to the defluorinating kiln.

11. The improvement according to claim 6, further characterized in that the amount of added $Na_2O$ and the amount of added $P_2O_5$ included in the moist mixture of concentrate, soda ash and acid are within the ranges of 6 to 7% and 8 to 10%, respectively, the moisture content of the mix is within the range of 12 to 15%, and the nodules for the most part are of a size within the range of 1/8 and 1/2 inch in diameter.

12. The improvement according to claim 11, further characterized in that at least 95% by weight of the phosphate rock concentrate is of a size within the range of minus 14 mesh and plus 150 mesh with at least 85% within the range of minus 20 mesh and plus 100 mesh, the phosphoric acid has an initial temperature within the range of 65 to 120° F., and the nodules are formed by centrifugal action in a plurality of superposed and rotating inclined pans.

13. In the method of producing a defluorinated phosphate product having high fertilizer availability in which a phosphate material is calcined in the presence of water vapor and without fusion at a temperature of at least 2500° F. until the fluorine remaining in the resulting calcine is less than one part per one hundred parts of phosphorus and the hot calcine is quenched to a temperature below 2000° F., the improvement which comprises mixing an unground phosphate rock concentrate with soda ash, mixing an aqueous solution of phosphoric acid with the premixed concentrate and soda ash moistened by the presence of from 12 to 15% by weight of water, the amount of soda ash (calculated as $Na_2O$) and the amount of phosphoric acid (calculated as $P_2O_5$) included in the moist mixture of concentrate, soda ash and acid being within the range of 6 to 7% and 8 to 10%, respectively, based on the dry weight of the mixture, forming the moist mixture of concentrate, soda ash and acid into porous nodules for the most part of a size within the range of 1/8 and 1/2 inch in diameter, and subjecting the nodules to calcination of the character hereinbefore recited in a rotary kiln in which the gases exhausted at the cold end thereof have a temperature of at least 1200° F. and the hot end thereof is maintained at a temperature of at least 2500° F.

14. The improvement according to claim 13, further characterized in that at least 95% by weight of the phosphate rock concentrate is of a size within the range of minus 14 mesh and plus 150 mesh with at least 85% within the range of minus 20 mesh and plus 100 mesh, the phosphoric acid has an initial temperature within the range of 75 to 95° F., and the nodules are formed by centrifugal action of a plurality of superposed and rotating inclined pans.

15. In the method of producing a defluorinated phosphate product having high fertilizer availability in which a phosphate rock with a silica content of from 2 to 6% is calcined in a rotary defluorinating kiln in the presence of water vapor and without fusion at a temperature of at least 2500° F. until the fluorine remaining in the rock is less than one part per one hundred parts of phosphorus and the resulting calcine is quenched to a temperature below 2000° F., the improvement which comprises feeding a nodulized mixture of the rock, soda ash and phosphoric acid to the cold end of the kiln while maintaining the gases exhausted from that end of the kiln at a temperature of about 1200° F. and maintaining a temperature of at least 2500° F. at the other end of the kiln, the phosphate rock of the nodulized mixture being an unground concentrate of which at least 85% by weight is within the range of minus 14 mesh and plus 150 mesh with at least 50% by weight plus 65 mesh and the nodulized mixture being prepared by adding phosphoric acid to and thoroughly mixing it with a mixture of the rock and soda ash moistened by the presence of from 10 to 20% by weight of water and forming the restuling moist mixture into porous nodules for the most part of a size within the range of ⅛ and ½ inch in diameter, the amount of soda ash (calculated as $Na_2O$) and phosphoric acid (calculated as $P_2O_5$) included in the mixture of rock, soda ash and acid being within the ranges of 5 to 9% and 7 to 11%, respectively, based on the dry combined weight of rock, soda ash and acid.

16. The improvement according to claim 15, further characterized in that promptly after the nodules are formed their surfaces are coated with a compatible powder-like material.

17. The improvement according to claim 15 further characterized in that the nodules are heated to a temperature of at least 450° F. prior to being fed to the rotary defluorinating kiln.

18. The improvement according to claim 15, further characterized in that at least 95% by weight of the coarse phosphate rock concentrate is of a size within the range of minus 14 mesh and plus 150 mesh with at least 85% within the range of minus 20 mesh and plus 100 mesh, and the nodules are formed by centrifugal action of a plurality of superposed circular pans of progressively increasing diameter rotating about their common center axis at an inclined angle.

19. The improvement according to claim 18, further characterized in that the amount of added $Na_2O$ and the amount of added $P_2O_5$ included in the moist mixture of concentrate, soda ash and acid are within the ranges of 6 to 7% and 8 to 10%, respectively, the initial temperature of the phosphoric acid is within the range of 75 to 95° F., and the moisture content of the mixed concentrate, soda ash and acid is within the range of 12 to 15%.

References Cited in the file of this patent

UNITED STATES PATENTS

| | | |
|---|---|---|
| 2,556,541 | Hollingsworth | June 12, 1951 |
| 2,556,542 | Hollingsworth | June 12, 1951 |
| 2,754,191 | Hollingsworth | July 10, 1956 |
| 2,839,377 | Hollingsworth et al. | June 17, 1958 |

UNITED STATES PATENT OFFICE

Certificate

Patent No. 2,995,436                  Patented August 8, 1961

Clinton A. Hollingsworth and William A. Kirkland

Application having been made by Clinton A. Hollingsworth and William A. Kirkland, the inventors named in the patent above identified, and Borden, Inc., a corporation of New Jersey, the assignee, for the issuance of a certificate under the provisions of Title 35, Section 256, of the United States Code, deleting the name of William A. Kirkland as a joint inventor, and a showing and proof of facts satisfying the requirements of the said section having been submitted, it is this 21st day of December 1971, certified that the name of the said William A. Kirkland is hereby deleted from the said patent as a joint inventor with the said Clinton A. Hollingsworth.

FRED W. SHERLING
*Associate Solicitor.*